United States Patent
Kochale et al.

(10) Patent No.: US 7,243,297 B2
(45) Date of Patent: Jul. 10, 2007

(54) METHOD FOR BIT RECOVERY IN AN ASYMMETRIC DATA CHANNEL

(75) Inventors: Axel Kochale, Springe (DE); Stefan Rapp, Schramberg (DE)

(73) Assignee: Thomson Licensing, Boulogne-Billancourt (FR)

( * ) Notice: Subject to any disclaimer, the term of this patent is extended or adjusted under 35 U.S.C. 154(b) by 469 days.

(21) Appl. No.: 10/853,527

(22) Filed: May 25, 2004

(65) Prior Publication Data

US 2004/0250194 A1 Dec. 9, 2004

(30) Foreign Application Priority Data

Jun. 5, 2003 (EP) .................. 03012779

(51) Int. Cl.
G06F 11/00 (2006.01)
H03M 13/00 (2006.01)
H04L 1/00 (2006.01)

(52) U.S. Cl. .................................. 714/809
(58) Field of Classification Search .......... 714/809
See application file for complete search history.

(56) References Cited

U.S. PATENT DOCUMENTS

| | | | | |
|---|---|---|---|---|
| 4,544,961 A * | 10/1985 | Chi | ................ | 360/40 |
| 4,713,696 A * | 12/1987 | Ishikawa et al. | ........ | 358/426.09 |
| 5,196,849 A * | 3/1993 | Galbraith | ...................... | 341/59 |
| 5,216,677 A * | 6/1993 | Takagi et al. | ................ | 714/765 |
| 5,257,270 A * | 10/1993 | Hilden et al. | ................ | 714/781 |
| 5,271,016 A * | 12/1993 | Hilden et al. | ................ | 714/752 |
| 5,311,521 A * | 5/1994 | Fitingof et al. | ............. | 714/755 |
| 5,325,403 A * | 6/1994 | Siwiak et al. | ............... | 375/347 |
| 5,341,386 A * | 8/1994 | Shimoda et al. | ............. | 714/795 |
| 5,373,513 A * | 12/1994 | Howe et al. | .............. | 714/775 |
| 5,444,680 A | 8/1995 | Umezawa et al. | ............ | 369/32 |
| 5,468,946 A * | 11/1995 | Oliver | ................... | 235/462.07 |
| 5,576,707 A * | 11/1996 | Zook | .......................... | 341/58 |
| 5,626,632 A | 5/1997 | Boyes | ........................ | 371/37.1 |
| 5,862,157 A * | 1/1999 | Bessios | ...................... | 714/799 |
| 6,144,324 A * | 11/2000 | Sasaki | ......................... | 341/94 |
| 6,683,922 B1 * | 1/2004 | Hayami et al. | ............. | 375/341 |

OTHER PUBLICATIONS

Search Report Attached.

* cited by examiner

*Primary Examiner*—Joseph D. Torres
(74) *Attorney, Agent, or Firm*—Joseph J. Laks; Ronald H. Kurdyla; Joseph J. Opalach

(57) ABSTRACT

A demodulator performs bit recovery in an asymmetric data channel, such as an optical recording media, by detecting runlength violations prior to demodulation, and correcting the detected runlength violations prior to the demodulation.

10 Claims, 4 Drawing Sheets

METHOD FOR BIT RECOVERY IN AN ASYMMETRIC DATA CHANNEL

FIELD OF THE INVENTION

The present invention relates to a method and an apparatus for compensating deteriorations and defects in data streams obtained from recording media.

BACKGROUND OF THE INVENTION

For current optical recording media runlength limited codes are used. For example, the Digital Versatile Disc (DVD) features a channel modulation which ensures a limitation of the runlengths of ones and zeroes of the recovered data stream basically between 3 and 11. Synchronisation patterns are modulated to get a runlength of 14. Therefore, these patterns can easily be distinguished from the other data.

More recent high density optical recording media, which are based on blue laser optics, will presumably use an even shorter runlength range of 2 to 8 consecutive ones or zeroes. An example for such a recording medium is the so called Blu-Ray Disk(BD). Unfortunately, the modulation transfer function (MTF) of the corresponding optical channel causes a typical amplitude of 2T runlengths, which is −26 dB smaller than the amplitude of the longest runlengths, as shown in FIG. 1. Therefore, additional signal processing is required to guarantee an acceptable Bit Error Rate (BER).

In current applications for optical recording media and hard disks partial response maximum likelihood detectors (PRML, Viterbi Decoder) are employed in the read channel prior to the demodulation process, in order to cope with higher rates of intersymbol interference (ISI) and to obtain an improved noise margin. A state of the art read channel is depicted in FIG. 2. Due to the modulation of the optical recording data pattern certain restrictions apply to the processing of such signals. For example, signal patterns with short runlengths are at the edge of the channels passband and exhibit a reduced signal magnitude. They are, therefore, vulnerable to bit misdetection. In addition, due to filter ripple and transition noise longer runlengths, which are actually detectable by simple slicing, might fail to be detected by a maximum runlength decoder. One further problem associated with the detection of bit information is the signal asymmetry, which disturbs the process of data slicing. This asymmetry has a strong influence on the quality of the bit detection, especially for the shortest runlengths.

It is, therefore, an object of the invention to propose a method for bit recovery in an asymmetric data channel, which overcomes the above problems, and an apparatus for reading from and/or writing to recording media using such method. Though the invention is described in the following with reference to optical recording media, it is also applicable to other types of recording media where signal asymmetry occurs.

SUMMARY OF THE INVENTION

According to the invention, a method for bit recovery in an asymmetric data channel, whereby the data are demodulated by a demodulator, comprises the steps of:
  detecting runlength violations prior to the demodulation, and
  correcting the detected runlength violations prior to the demodulation.

Detecting the runlength violations prior to the demodulation enhances the performance of the read channel system.

Favourably, the method further comprises the step of monitoring the rate and/or the trend of runlength violations for obtaining a signal quality indication. The signal quality indication can serve as a measure of the signal quality of the read channel data stream.

Advantageously, the signal quality signal is used for compensating signal distortions or for changing the playback strategy. For example, the playback speed of the data reception system might be slowed down to obtain a more reliable read signal or speeded up if the signal quality is sufficiently high.

Favourably, the method further comprises the step of expanding the signal data close to a signal zero crossing. In this way a more reliable signal slicing is ensured.

Advantageously, the method further comprises the step of deciding whether or not the steps of detecting and correcting the runlength violations are to be performed based on the signal quality. If the signal quality is sufficiently high, no correction is necessary. Only if the signal quality falls below a certain threshold a correction of the signal becomes necessary. By limiting the correction to low quality signals it is ensured that in case of a sufficient signal quality the data reproduction rate is not unnecessarily reduced.

Favourably, a device for bit recovery in an asymmetric data channel, whereby the data are demodulated by a demodulator, comprises means for performing a method according to the invention.

Furthermore, a method or a device according to the invention are favourably used in an apparatus for reading from and/or writing to recording media for bit recovery in an asymmetric data channel.

BRIEF DESCRIPTION OF THE DRAWINGS

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
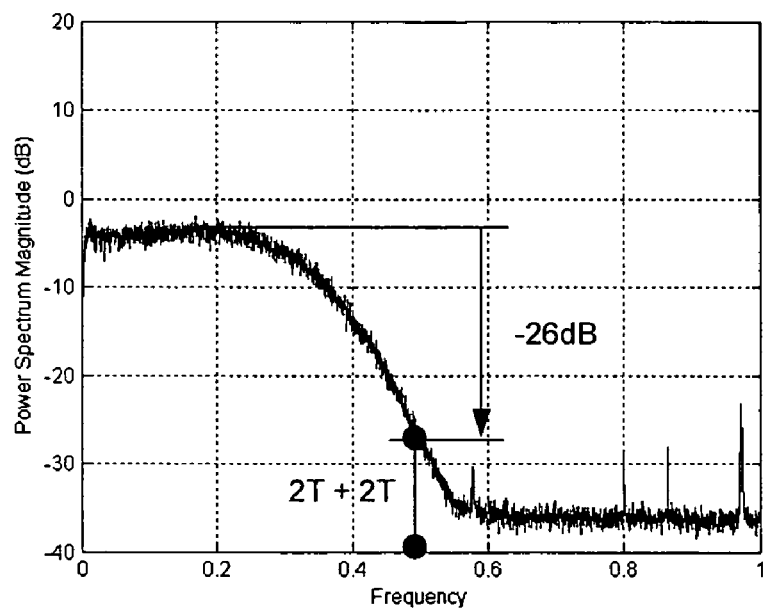
FIG. 1 shows an exemplary modulation transfer function for a high density optical recording medium.
Figure 2:
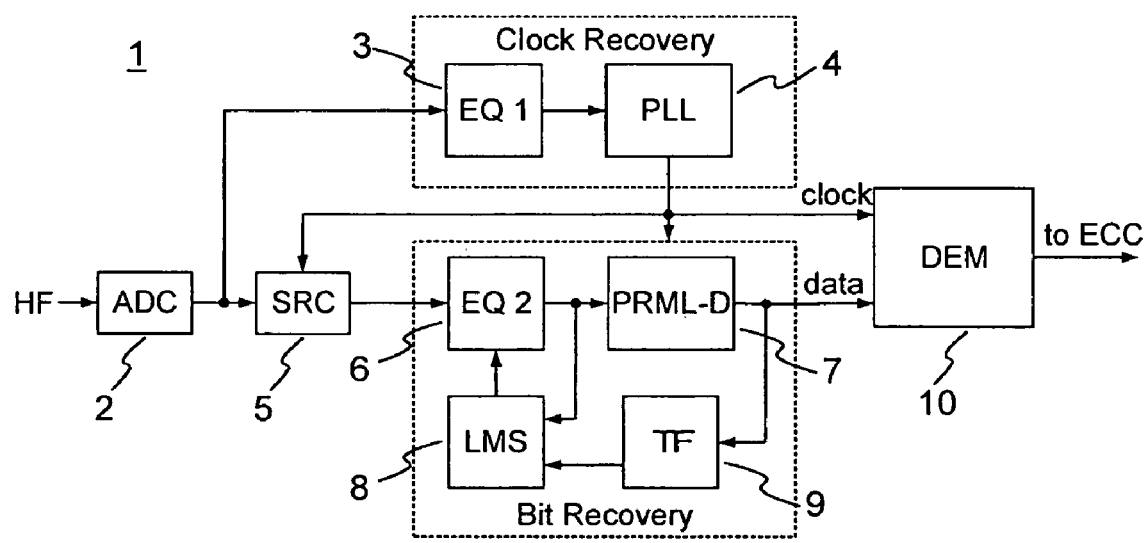
FIG. 2 shows a read channel according to prior art.

In FIG. 2 an exemplary read channel 1 according to prior art is shown. The read channel 1 performs clock recovery and bit recovery processing. The channel data HF obtained from a recording medium are input into an analog to digital converter 2 (ADC). After an equalization step by a first equalizer 3 (EQ1) the digitised data stream is fed to a PLL block 4, which recovers the clock. Since it is common to use an All Digital PLL (ADPLL) for this stage, the recovered clock signal is basically a clock enable signal for a system clock used in the hardware design.

The digitised data stream is resampled in a Sample Rate Converter 5 (SRC) with the clock reference. Next, it is filtered in an Adaptive Equalizer 6 (EQ2) and passed to a partial response maximum likelihood detector 7 (PRML-D, also known as Viterbi Decoder). The coefficients of the equalizer 6 are updated by calculating the distance of the equalizer output to the Viterbi Decoder output using a well known Least-Mean-Square algorithm 8. For matching the output of the Viterbi Decoder 7, which represents a data stream of bits, to the equalizer output, which still consists of quantized HF levels, a so called Target Filter 9 (TF) is used. This filter 9 basically inverts the decoding performed by the Viterbi Decoder 6, which is designed to follow a specific target polynomial. This target polynomial—and therefore the Target Filter 9—approximates the modulation transfer function of the channel on which it is working. Different channels (like DVD and BD) require, therefore, different modelling and target polynomials.

The output of the Viterbi Decoder 7 as the recovered bit stream is passed to a Demodulator 10 (DEM) and further to an Error Correction Controller (ECC, not shown). Since the Demodulator 10 needs to synchronise to the data to find the proper processing start location, it is the first block which detects faults within the data stream as soon as the synchronisation is accomplished. Therefore, it is common that the Demodulator 10 supports other blocks with additional error information, e.g. with a lock helper signal for the PLL 4 or an erasure information for the ECC.

Figure 3:
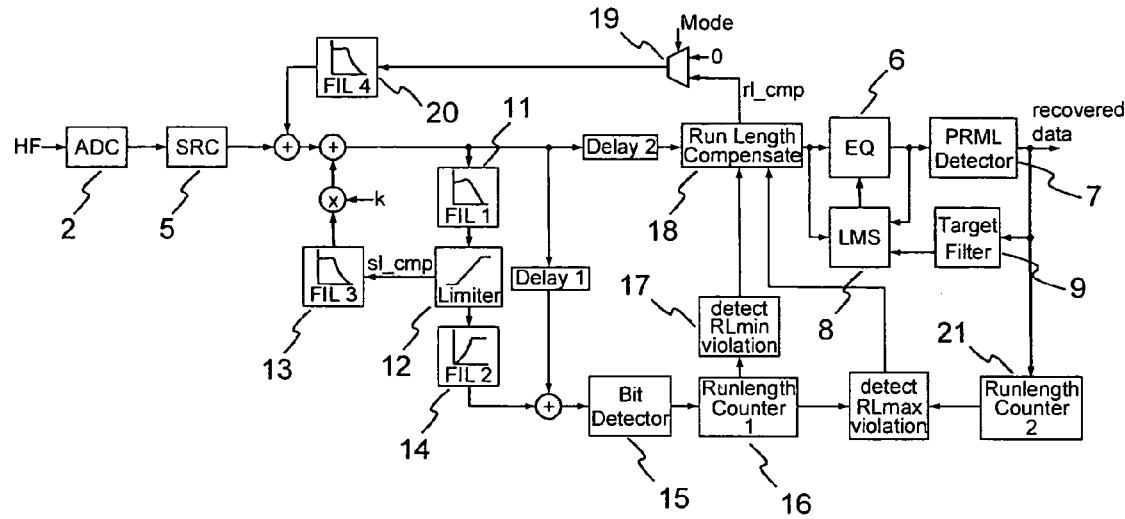
FIG. 3 schematically shows a circuit for bit recovery according to the invention.
Figure 4:
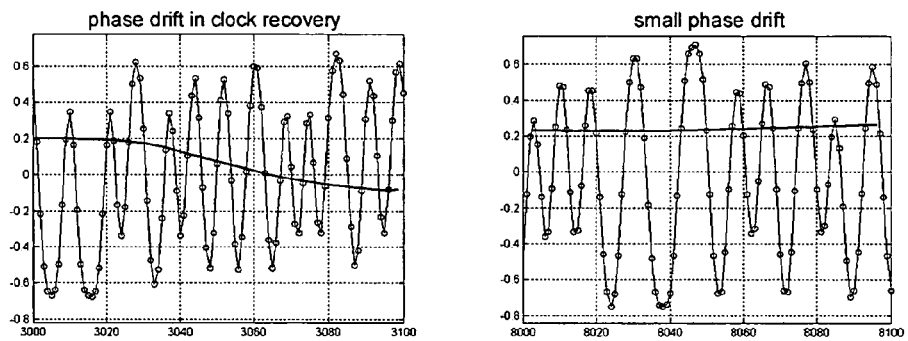
FIG. 4 schematically depicts two cases of phase drift during signal resampling.
Figure 5:
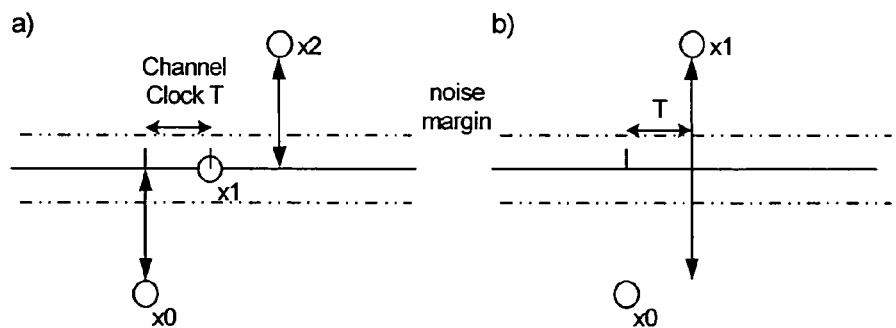
FIG. 5 indicates the dependence of the zero crossing sampling on the clock phase.

A possible way of detecting runlength violations and its use for compensating of signal distortions is described in the following with reference to FIG. 3. First, the high frequency channel data stream HF is sampled, digitised by an analog to digital converter 2 (ADC), and resampled to the channel clock rate supplied by a PLL circuitry (not shown) by a sample rate converter 5 (SRC). This processed data stream is filtered by a first filter 11 (FIL1), which is designed to boost the short run length data patterns, i.e. 2T for BD. A following limiter 12 ensures an expansion of the signal data close to the signal zero crossing. A compensation signal sl_cmp is obtained by taking into account a threshold value found during the limiting process. The threshold value is calculated as the mean difference of the sample values around the zero crossing point. Due to insufficiencies in signal resampling, which are depicted in FIG. 4, two cases of zero crossing may occur. These cases are shown in FIG. 5 in more detail.

Depending on the type of case the difference between consecutive samples (case b)) or between samples further separated (case a)) has to be calculated. In addition, since three samples may already exhibit a runlength violation, a further compensation offset is favourably added depending on the distribution of the samples around the zero crossing (e.g. x0 and x2 above zero crossing and x1 below, or vice versa). To prevent or to at least minimize misdetection of both cases due to clock jitter and/or noise a noise margin is advantageously considered.

Figure 6:
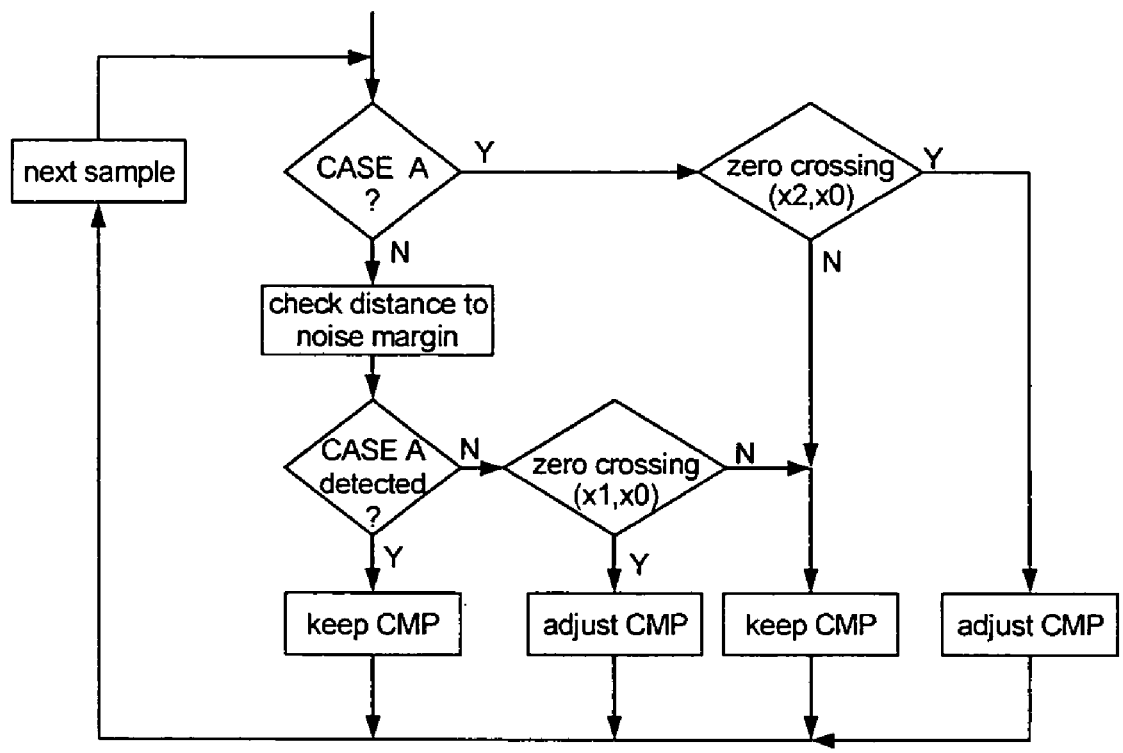
FIG. 6 shows a state machine for handling different resampling cases.

In FIG. 6 a simple state machine is shown, which detects and handles both resampling cases. First, the state machine needs to know which case will be handled next. This is known as soon as the next zero crossing occurs (e.g. x0>0 and x1<0). A compensation factor cmp is now calculated according to the following formula:

$$cmp_{new} = cmp_{old} + (const*(x1-x0) - cmp_{old})/abs\_value,$$

where abs_value is equal to the signal range, e.g. 2 if the input signal range is [−1; +1]. As an example, const is chosen equal to 0.5. Based on the compensation factor cmp the compensation signal sl_cmp is obtained.

Returning to FIG. 3, the obtained compensation signal sl_cmp is now used to compensate for the asymmetry. It represents the distance between two adjacent samples around the zero crossing point, i.e. the slice level. The compensation signal sl_cmp is averaged over several samples by a third filter 13 (FIL3) and damped by a factor k. However, as the input signal is known it is also possible to employ the compensation for the short runlengths data sequences only, since they have a smaller magnitude.

Figure 7:
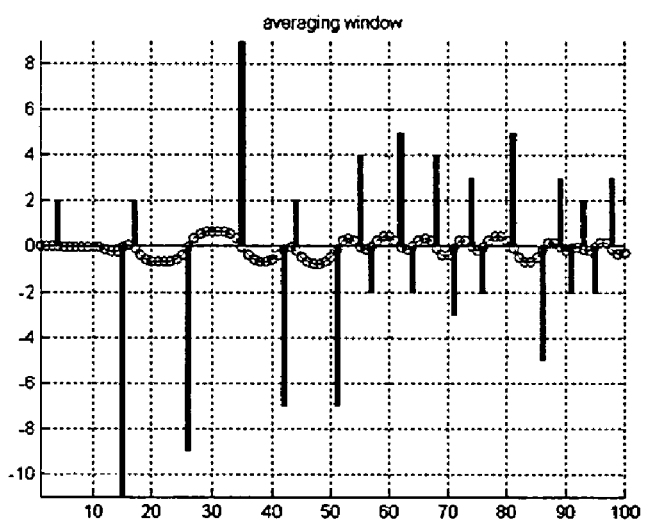
FIG. 7 shows an example of runlengths counting.

As mentioned before, the compensation factor cmp is used as a threshold for amplifying the incoming data samples around the zero crossing point. This is achieved through a simple comparison with the incoming samples (IS). The incoming samples are simply put through as outgoing samples (OS) as long as these samples are greater than or equal to the compensation value cmp. Otherwise the compensation value is transmitted, taking into account the sign of the incoming sample. The overall behaviour can be summarized as follows:

if abs(IS)>=CMP
    OS=IS;
else
    OS=sign(IS)*CMP;

The boosted data stream is high pass filtered by a second filter 14 (FIL 2), since the main improvement is achieved for the shorter runlengths, i.e. the higher frequencies. By adding the original data stream to this signal a new signal is obtained having an improved high frequency behaviour. Using a simple threshold bit detector 15 the digital bits are detected from this signal data. A first runlength counter 16 now retrieves the runlengths relying on a reasonable error rate by counting the samples above and below the zero crossing point, as shown in FIG. 7.

Figure 8:
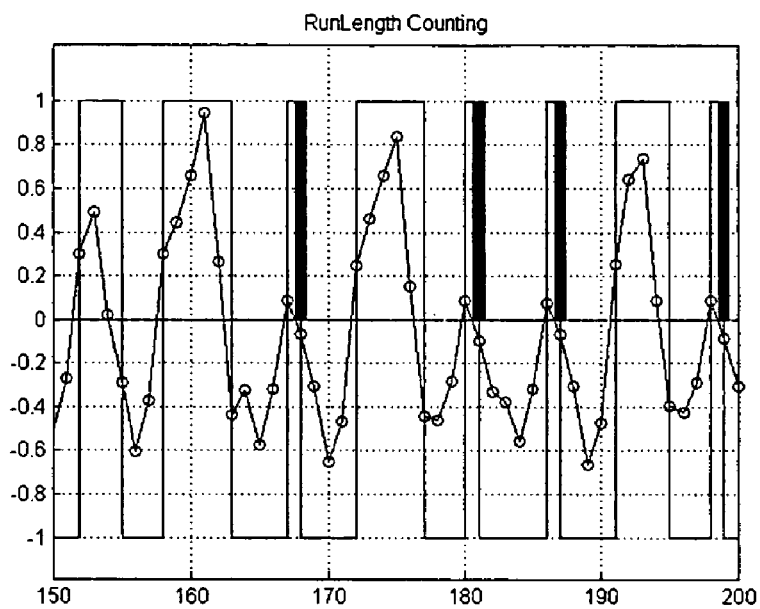
FIG. 8 shows detected possible minimum runlength violations.

Based on the retrieved runlengths, violations of the minimum runlength are now detected and corrected using a first runlength violation detector 17 and a runlength compensator 18. An example of a minimum runlength violation is shown in FIG. 8. The detected violating sample is advantageously used as a mean value for compensating the signal distortion. For this purpose an accumulator 19 is fed with a runlength compensation signal rl_cmp as long as the violation occurs. The increasing or decreasing value of the accumulator 19 is damped by a fourth filter 20 (FIL4) and added to the resampled data stream.

Figure 9:
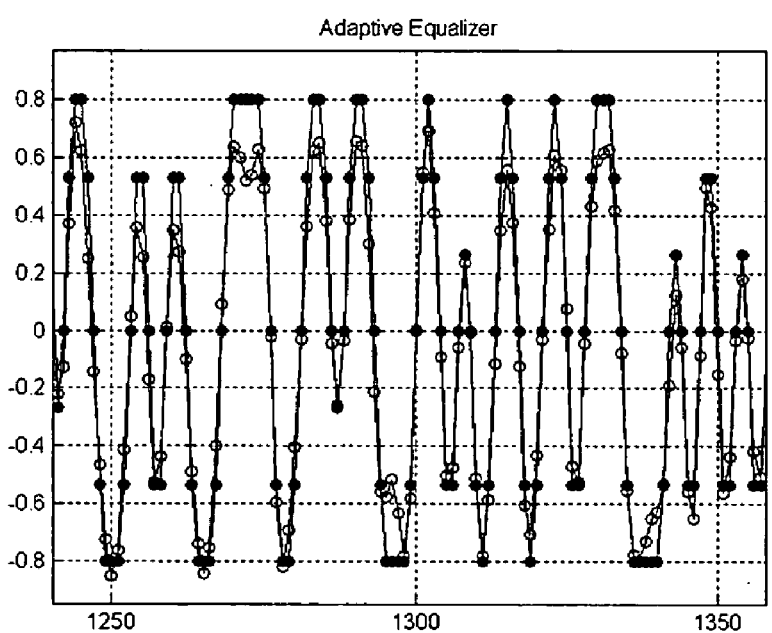
FIG. 9 shows a comparison between input samples and refiltered Viterbi output samples.

Furthermore, the signal quality and the noise level are monitored by measuring the ripple on the long runlengths. If the noise level is too large, the Viterbi decoding is likely to fail. This is detected using the output of a second runlength counter 21. The previously detected long runlength is delayed and compared with the output of the Viterbi decoder 7 filtered by the target filter 9. The mean distance between the input samples and the filtered Viterbi output sample gives a measure of signal quality and bit recovery performance. An example of the distance between the input signal (open circles) and the filtered Viterbi decoder output (filled circles) is shown in FIG. 9.

What is claimed is:

1. A method for bit recovery in an asymmetric data channel, whereby the data are demodulated by a demodulator, comprising the steps of:
   detecting runlength violations prior to demodulation by runlength counting, and
   correcting the detected runlength violations prior to demodulation.

2. The method according to claim 1, further including the step of monitoring the rate and/or trend of runlength violations for obtaining a signal quality indication.

3. The method according to claim 2, wherein the signal quality indication is used for compensating signal distortions or for changing a playback strategy.

4. The method according to claim 1, further including the step of expanding the data close to a zero crossing.

5. The method according to claim 1, further including the step of deciding whether or not the steps of detecting and correcting the runlength violations are to be performed based on a signal quality.

6. An apparatus for bit recovery in an asymmetric data channel, whereby the data are demodulated by a demodulator, the apparatus comprising:
   a runlength counter and a runlength violation detector for detecting runlength violations prior to demodulation; and
   a runlength violation corrector for correcting the detected runlength violations prior to demodulation.

7. The apparatus according to claim 6, further including means for monitoring the rate and/or trend of runlength violations for obtaining a signal quality indication.

8. The apparatus according to claim 7, wherein the signal quality indication is used for compensating signal distortions or for changing a playback strategy.

9. The apparatus according to claim 6, wherein it includes a limiter for expanding the data close to a zero crossing.

10. The apparatus of claim 6, wherein the data of the asymmetric data channel is read from a recording media.

* * * * *